Figure 1:
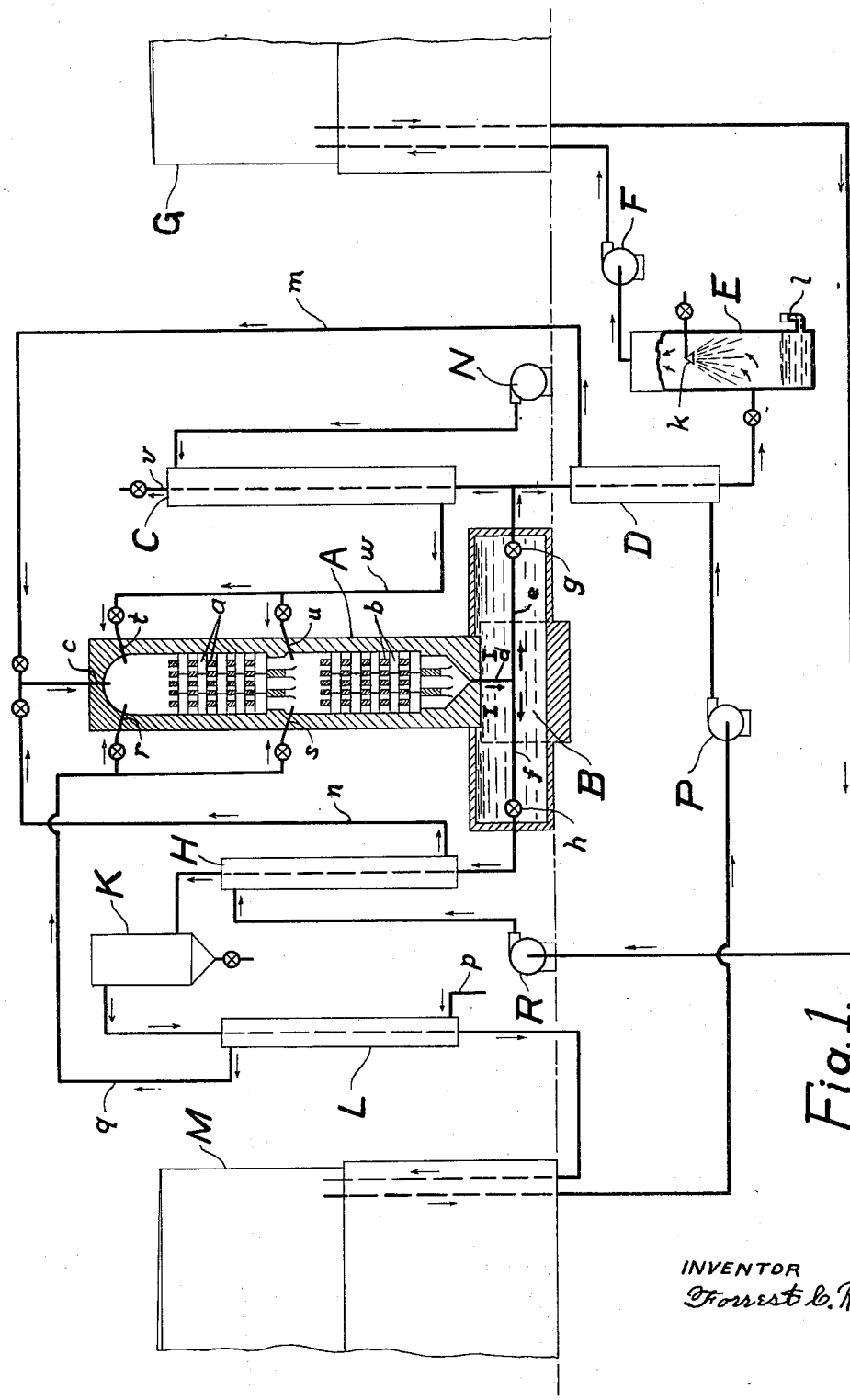

Jan. 18, 1938.　　　　F. C. REED　　　　2,106,137
PROCESS OF PRODUCING CARBON BLACK
Filed July 9, 1934　　　2 Sheets-Sheet 1

INVENTOR
Forrest C. Reed

Patented Jan. 18, 1938

2,106,137

UNITED STATES PATENT OFFICE 2,106,137

PROCESS OF PRODUCING CARBON BLACK

Forrest C. Reed, Kansas City, Mo.

Application July 9, 1934, Serial No. 734,436

13 Claims. (Cl. 134—60)

This invention relates to a process of producing carbon black by the thermal dissociation of hydrocarbons and more particularly to an improved process of producing carbon black of superior quality and has for its primary object, to provide a preferred method of producing carbon black in an atmosphere of hydrogen diluted with nitrogen and a limited quantity of the oxides of carbon, another object is to provide a method of producing carbon black in a diluted atmosphere of hydrogen free from the presence of water, thereby with either method, improving the quality and increasing the quantity of carbon recovered from the dissociation of a given quantity of hydrocarbons, and a further object is to provide other advantages as may be brought out in the following description and drawings.

It is known that the better grades of carbon have been produced by the incomplete combustion processes. The inefficiency of such processes is well known and various attempts have been made to improve them such as by recycling combustion gases with the hydrocarbons to be dissociated. In other instances hot combustion gases are mixed with hydrocarbons and subjected to high temperatures by passing the mixture over heated checkerwork. The objection to these former methods of utilizing combustion gases as diluents in the production of carbon black is the wasteful consumption of carbon which reacts with the carbon dioxide and the steam of the combustion gases to form carbon monoxide, as, e. g., when three volumes of combustion gases are mixed with one volume of hydrocarbons to be dissociated, it is easily shown by calculations that over one-half of the carbon resulting from the dissociation of hydrocarbons is consumed by the foregoing reaction which likewise absorbs a great amount of heat. When a larger proportion of combustion gases are used in the above manner, a proportionately larger quantity of carbon is consumed and only a small portion of the heat of combustion is utilized in a useful manner.

The waste of carbon in the reaction with the carbon dioxide and water of combustion gases as referred to above is useless as far as any benefits are concerned when the carbon recovered is used for such purposes as the manufacture of certain kinds of rubber, while on the other hand, when the carbon is used for other purposes such as for certain ink pigments, a small quantity of adsorbed gases are beneficial as they tend to prevent the agglomeration of the carbon particles. An analysis of carbon black suitable for the latter purposes and from which moisture and air have been removed, shows that the adsorbed gases consist mainly of the oxides of carbon and a small percentage of nitrogen. Now when three volumes of combustion gases are mixed with one volume of hydrocarbons to be dissociated as in the previous example, there will be in the combustion gases from fifty to one-hundred times the quantity of the oxides of carbon that are adsorbed in the carbon product, and in addition to the oxides of carbon about 18% of the combustion gases resulting from the combustion of hydrocarbons is water, all of which contribute to a useless waste of heat and carbon which is eliminated by the present invention.

The process of the present invention retains all of the advantages of using diluents but overcomes other disadvantages of former processes by producing carbon in an atmosphere preferably of hydrogen diluted with nitrogen and a limited quantity of the oxides of carbon. Briefly, the invention is carried out by the preferred method in closed retorts containing heat contacting surfaces of refractory material and subjected to alternating periods of heating and dissociation. The nitrogen and limited quantity of the oxides of carbon for diluents in the dissociation period are produced in the heating period by burning hydrogen and a definite but limited quantity of hydrocarbons; the carbon of the latter producing a definite and limited quantity of the oxides of carbon and all of the hydrogen of the mixture burning to water. Since it is unnecessary to utilize all of the combustion gases produced in the heating period for diluents, only a portion of the combustion gases need be cooled and the water from the combustion of hydrogen condensed and removed. The gases remaining after the removal of water will then consist substantially of nitrogen and a limited quantity of the oxides of carbon, these gases are then subjected, together with the hydrocarbons to be dissociated, to high temperatures thereby producing carbon in an atmosphere of hydrogen diluted with nitrogen and a limited quantity of the oxides of carbon. All of the advantages of former processes of using diluents are thus retained but the disadvantages of the wasteful reaction of carbon with large quantities of water and carbon dioxide are overcome by the process of the present invention where the loss of carbon by reaction with water is entirely eliminated and the reaction with carbon dioxide can be controlled and limited to small quantities.

The quantity of hydrocarbons to be burned with hydrogen during the heating period to produce a limited quantity of the oxides of carbon in the combustion gases of the preferred method of operating the present invention can be introduced from an external source during the heating period or the degree of dissociation can be controlled to produce a limited quantity of undecomposed hydrocarbons with the hydrogen produced during the dissociation period, the degree of dissociation being controlled by the operating temperatures and velocity of gases thru retorts. The oxides of carbon are also produced by the combustion of carbon on checkerwork as will be discussed later.

One type of apparatus suitable for carrying out the process of the present invention is shown in the accompanying drawings in which like characters of reference indicate similar parts thruout.

Figure 2:
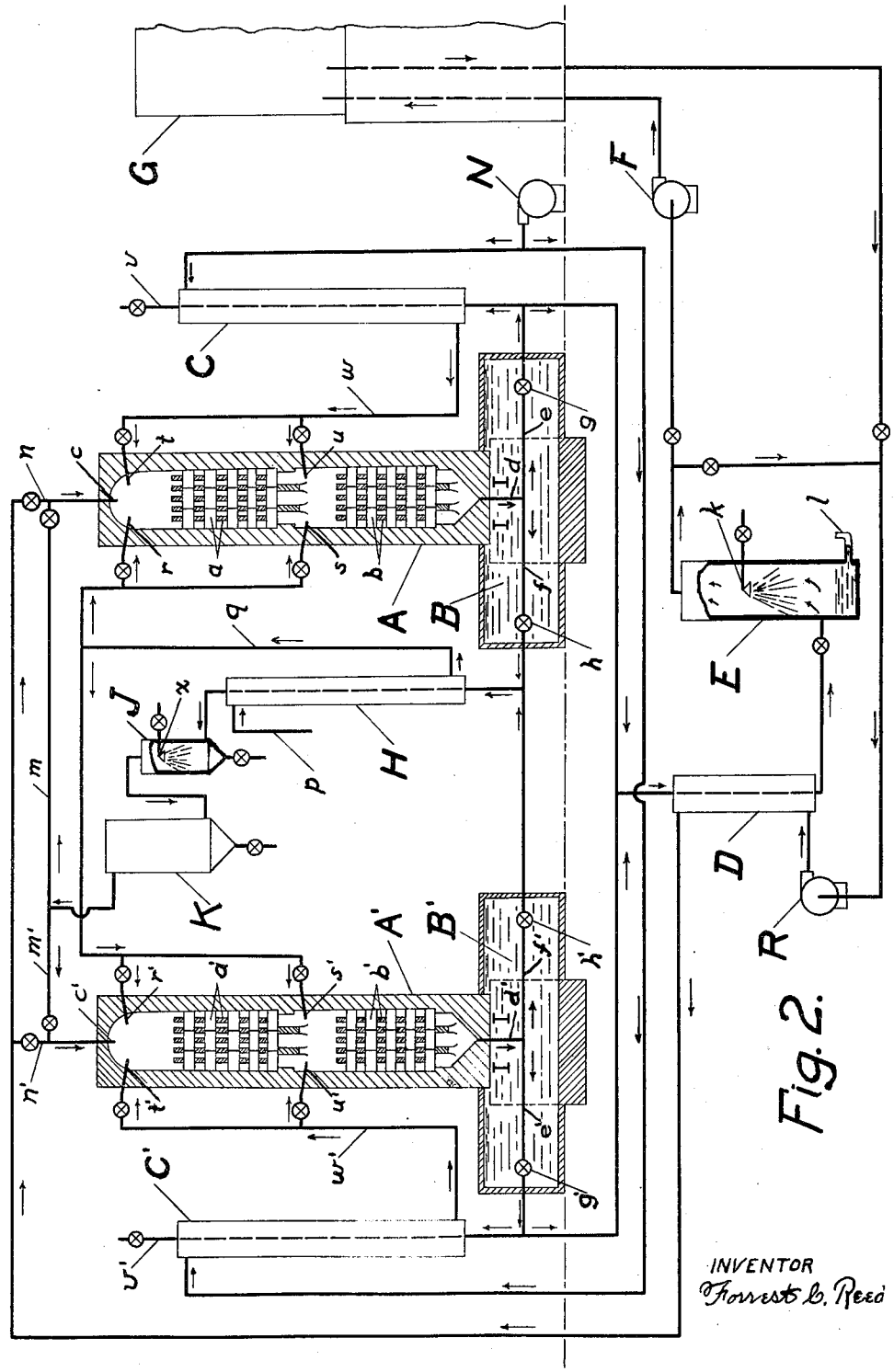

Figure 1 is an elevation, shown diagrammatically and partly in section, of apparatus having one retort, and, Figure 2 is an elevation, shown diagrammatically and partly in section, of apparatus having two retorts of the type shown in Figure 1.

Referring now to Figure 1, A is a closed retort capable of operating at high temperatures and suitable for alternating periods of heating and dissociation and having preferably two separate sections or fillings of refractory material and shown here as checkerwork sections $a$ and $b$, $c$ is an inlet pipe for admitting either diluents for the dissociation period or hydrogen for the combustion period, $d$ is an outlet or discharge pipe communicating with discharge pipes $e$ and $f$ having suitable valves $g$ and $h$, respectively, $r$ and $s$ are nozzles for admitting hydrocarbons, $t$ and $u$ are nozzles for admitting air for combustion, any of these inlet connections may consist of a plurality of pipes or nozzles, or the connections $t$ and $u$ could be in the form of burners with connections for a combustible gas and air. The two sections of checkerwork $a$ and $b$ can be of the same size or of different sizes as desired, and all except one modification of the process could as well be carried out with checkerwork consisting of a single section instead of two sections as shown in the drawings, this modification will be described later. Two sections of checkerwork permit of better temperature control in apparatus of large capacity. B is a water tank for partially cooling the gases discharged from retort and thereby permitting the use of metal heat exchangers and protecting the valves $g$ and $h$ from excessive heat. Obviously, some heat is lost by the partial cooling in this manner but it makes possible the saving by heat exchange of a large part of the heat which is usually all wasted, and furthermore, a higher quality carbon is produced by quickly reducing the temperature of the products of dissociation as they are discharged from retort. C, D, H and L are heat exchangers, E is a cooling apparatus with water spray $k$ and water seal $l$ and suitable for condensing and removing, from the gases of combustion, the water formed by the combustion of hydrogen. K is an apparatus such as an electrical precipitator and suitable for separating the carbon from the gases of dissociation. P, R, N and F are blowers for circulating the gases of the process. G is a gas holder for the diluents (nitrogen and a limited quantity of the oxides of carbon) to be used in the dissociation period, and M is a gas holder for the hydrogen produced by the dissociation of hydrocarbons and mixed with the diluent gases.

The process of the present invention can be carried out with the apparatus of Figure 1 in the following manner. Starting with the heating period, hydrogen for combustion, and mixed with other diluents from the dissociation period as will be shown later, is drawn from the gas holder M by blower P and forced thru heat exchanger D and pipe $m$ and inlet connection $c$ to retort A, and at the same time a small and limited quantity of hydrocarbons for the production of the oxides of carbon in the combustion gases is admitted to the retort thru nozzle $r$, while air for combustion is forced by blower N thru heat exchanger C and pipe $w$ to retort thru either nozzle $t$ or thru both nozzle $t$ and nozzle $u$, the temperature of the two sections of checkerwork $a$ and $b$ can be controlled by admitting part of the air for combustion at $u$ when desired. Combustion proceeds over checkerwork sections $a$ and $b$ and the gases of combustion are discharged thru pipe $d$ to pipe $e$ where they are partially cooled by water tank B, a portion of the gases are then passed thru heat exchanger C and thence to the atmosphere thru stack $v$, while another portion is passed thru heat exchanger D preheating the gases for combustion, and thence to condensing apparatus E where the water from the combustion of hydrogen is removed, the remaining gases, mainly nitrogen with a small and limited quantity of the oxides of carbon, is forced by blower F into gas holder G from whence it is drawn for the dissociation period. The limited quantity of the oxides of carbon can, as previously stated, be produced in the combustion gases by controlling the dissociation to produce hydrogen for the heating period and containing a small quantity of undecomposed hydrocarbons of the order of about 4 to 6%, or the hydrocarbons can be introduced during the heating period and thru nozzle $r$ as above described. Heating is thus continued until the checkerwork reaches the temperature desired for dissociation.

When the heating period is completed, the valves are manipulated to change over to the dissociation period. The diluene gases are drawn from the holder G by blower R and forced thru heat exchanger H and pipe $n$ to retort A thru inlet connection $c$, while hydrocarbons are passed in from pipe $p$ thru heat exchanger L and pipe $q$ to retort A thru either nozzle $r$ or $s$. A very high quality carbon black can be produced by passing the diluent gases admitted at $c$ over checkerwork $a$, thereby heating it above the dissociation temperature of the hydrocarbons, then admitting hydrocarbons at nozzle $s$ only and permitting the dissociation to proceed at decreasing temperatures over checkerwork $b$, or hydrocarbons can be admitted at $r$ and passed, with the diluent gases admitted at $c$, over both sections $a$ and $b$ of checkerwork. In either case, carbon is produced in an atmosphere of hydrogen diluted with nitrogen and a limited quantity of the oxides of carbon. This gas mixture has a much greater density than hydrogen and therefore a greater carrying capacity for the carbon produced therein so that the carbon is more readily swept along thru the apparatus and has less tendency for lodging or for the agglomeration of the particles. While this invention is not based on any particular theory, yet it appears probable that the reason for the improved quality of carbon produced in a diluted atmosphere of this kind is that the individual particles of carbon are farther separated from each other than they would be if produced in the smaller volume of hydrogen resulting from dissociation, and nitrogen having also a lower heat conductivity than hydrogen, there is less tendency for the agglomeration of the finer carbon particles, and furthermore, a small portion of the oxides of carbon is adsorbed by the carbon black produced therein, thus giving the carbon black a quality desirable for certain ink pigments. The carbon thus produced is kept in a finely divided state and passed with the gases out discharge pipe $d$ and into pipe $f$ where they are partially cooled by water tank B, and thence thru heat exchanger H where they are further cooled before passing to carbon separator K which operates in this case of an electrical precipitator at temperatures of preferably about 700 to 900° F. After the removal of carbon at K, the remaining hydrogen with diluent gases is still further cooled thru heat exchanger L and then passed on to gas holder M from whence the mixture is drawn for the heating period as previously described.

Figure 2 shows apparatus consisting of two units, each of which are similar to the unit of Figure 1 as indicated by the characters of reference where similar parts are indicated by like characters of reference with a prime affixed thereto for the duplicated parts. The heating and dissociating periods of retorts A and A' are alternated so that while one is on the heating period, the other is on the dissociating period. The gas holder M and heat exchanger L of Figure 1 are omitted from the apparatus of Figure 2 because the gases from the dissociation period of one retort are utilized directly while still in a heated condition for the heating period of the other retort thereby saving considerable heat. The apparatus of Figure 2 is provided with an additional temperature regulating means in the form of a chamber J having a suitable nozzle $x$ for spraying a cooling medium into the gases of dissociation. The preheating of the gases with the apparatus of Figure 2 is somewhat altered from that of Figure 1 as will be seen from the following description where retort A is assumed to be in the heating period and retort A' in the dissociating period. Air for combustion in retort A is forced by blower N thru heat exchanger C and pipe $w$ into retort thru either nozzle $t$ or thru both nozzles $t$ and $u$ as desired for regulating the temperature of sections $a$ and $b$ of checkerwork. Hydrogen for combustion in retort A is supplied from the dissociation of hydrocarbons in retort A' thru pipe $m$ and connection $c$, while at the same time a limited quantity of hydrocarbons is supplied for combustion with the hydrogen in the manner described below. The gases of combustion are discharged thru pipe $d$ into pipe $e$ where they are partially cooled in tank B, then part is passed thru heat exchanger C to preheat the air for combustion and then discharged to the atmosphere thru stack $v$, while the remaining part is passed thru heat exchanger D to preheat the diluent gases for the dissociation period in retort A'. From D these gases of combustion are passed to apparatus E and cooled by the water spray $k$, thus condensing and removing the water formed by the combustion of hydrogen, the remaining gases, mainly nitrogen with a limited quantity of the oxides of carbon, are either passed on to the gas holder G by blower F, or passed directly back thru heat exchanger D by blower R to the retort operating in the dissociation period. In either case, the gases thus produced are utilized as a diluent in the dissociation period. The limited quantity of the oxides of carbon are produced with the apparatus of Figure 2 in the same manner described for the apparatus of Figure 1, i. e., by introducing a small quantity of hydrocarbons with the hydrogen for combustion during the heating period, or by controlling the degree of dissociation to produce hydrogen with a limited quantity of undecomposed hydrocarbons, or by a combination of both methods.

While retort A is thus operating in the heating period, preheated diluent gas is supplied by blower R thru pipes $i$ and $n'$ and inlet connection $c'$ to retort A', and hydrocarbons for the dissociation period are supplied thru pipe $p$ and preheated by heat exchange with the exit gases of dissociation in H then passed on thru pipe $q$ to retort A' thru either nozzle $r'$ or $s'$ and for the same reason given in previous description of Figure 1. In either case as dissociation progresses over checkerwork, carbon black is produced in an atmosphere of hydrogen diluted with nitrogen and limited quantities of the oxides of carbon, a small portion of the latter being adsorbed by the carbon black produced thereby giving the carbon black a quality desirable for ink pigments. The products of dissociation are discharged from retort thru pipe $d'$ into pipe $f'$ where the temperature is lowered in passing thru cooling tank B', then thru heat exchanger H and thereby preheating the hydrocarbons for dissociation, then thru temperature regulator J, then thru separator K where the carbon black is removed, and finally the remaining gases (hydrogen and diluents) are passed on thru pipe $m$ to retort A for heating purposes as previously described. After the heating and dissociation periods are completed as described, they are then reversed in the two retorts. Obviously, the retort operating in the dissociation period must operate at slightly higher pressure than the retort operating in the heating period unless the pressure of the gases of dissociation are boosted by a blower previous to their use in the combustion period, in which case a gas holder may be conveniently used to take care of the fluctuation in the use of, and production of gases of dissociation. When any appreciable amount of carbon is deposited on checkerwork, it may be desirable to allow the gases of combustion to escape thru stacks $v$ and $v'$ for a short interval when the heating period is starting, there will however, be very little carbon deposited on checkerwork constructed of special checker units as will be pointed out later.

When diluents are not used in the dissociation period of thermal processes producing carbon black, only part of the hydrogen produced is needed for the heat requirements of the process and since the quantity of hydrogen produced in this manner is so great and the market so limited, the excess hydrogen is often wasted. With the process of the present invention all of the hydrogen produced by dissociation can be utilized for improving the quality of carbon black produced, for obviously, the hydrogen required for heating purposes increases with increased quantities of diluents used in the dissociation period, and the quality of carbon black improves with increased quantities of diluents. The maximum quantity of diluents permissible for the dissociation period depends on the heating value of the hydrogen produced, the temperature of operation, and the degree of preheating within the process. In general from two to four volumes of diluents can be introduced with one volume of hydrocarbons to be dissociated. A larger proportion of diluents can be used when considerable carbon is deposited on checkerwork and burned for heating purposes in addition to the hydrogen produced, but since the value of carbon, as carbon black, is from ten to fifteen times greater than its value for heating purposes, the combustion of carbon in this manner is not desirable.

A large part of the carbon produced in the closed retorts of thermal processes using the ordinary rectangular type of checker units is deposited on the checkers and burned for heating purposes and while such processes can be greatly improved by the method of the present invention, yet much better results are obtained with checker units such as described in my U. S. Patent 1,980,827, Nov. 13, 1934 for Apparatus for the production of carbon black. With these novel checker units abrupt contacting surfaces are avoided thus preventing the separation of carbon black from the gases so that the larger part of the carbon resulting from dissociation is recovered and when such checker units are used with the process of the present invention where carbon is produced in a denser atmosphere of hydrogen and diluents having an increased capacity for carrying carbon, practically all of the carbon black resulting from dissociation is swept thru the apparatus and recovered as carbon black of superior quality.

The wasteful nature of former processes using hot combustion gases as diluents will be seen from the following figures where for simplicity methane is taken as an example of a hydrocarbon burned for heating purposes and the production of diluents to be used in the dissociation of methane, the ratio of diluents to methane dissociated being considered as three to one. There is always some CO as well as $CO_2$ in combustion gases but for simplicity only $CO_2$ is considered here. It is, of course, well known that combustion can be controlled to produce a greater or less quantity of either of the oxides of carbon.

Combustion of methane

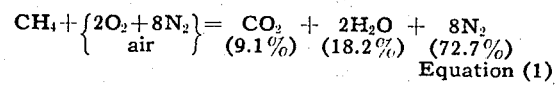

Equation (1)

Dissociation of methane (1000 cu. ft.)

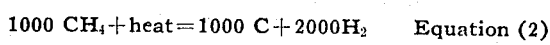   Equation (2)

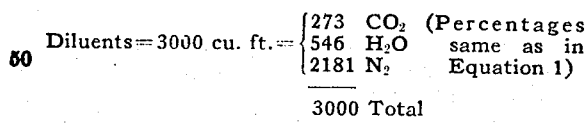

3000 Total

Reaction of carbon with the $CO_2$ and $H_2O$ of diluents

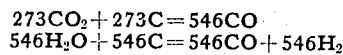

Total____819C

The total carbon (819C) consumed in the reaction with the $CO_2$ and $H_2O$ of diluents is then theoretically 81.9% of the total carbon (1000C) resulting from the dissociation of methane as in Equation 2 above. While in actual practice all of the water in combustion gases does not react with carbon as indicated in the foregoing example, yet the total carbon consumed will be considerably over 50% of the carbon resulting from dissociation, and furthermore, these carbon consuming reactions are accompanied by a considerable absorption of heat so that only a small portion of the heat of combustion from the production of the diluent gases is utilized in a useful manner.

The advantages of the process of the present invention will be obvious when it is considered that by the preferred method described, the waste of carbon by reaction with water is entirely eliminated and the reaction of carbon with the oxides of carbon can be controlled and limited to small quantities of the latter and of the order of from 2 to 4% of the diluent gases, the total loss of carbon then being only about one-fifth that of former processes using hot combustion gases as diluents and at the same time all of the advantages of using diluents are retained by the present process where the quantity of carbon is small in proportion to the volume of gases in which it is produced and where the carbon is produced in a denser atmosphere, and where carbon black having properties caused by the adsorption of the oxides of carbon and desirable for ink pigments is produced at will by controlling and limiting the quantity of the oxides of carbon present in the diluent gases.

The foregoing description has referred to a preferred method of operation where diluent gases containing a limited quantity of the oxides of carbon are produced, yet it is obviously within the scope of the present invention to produce diluent gases by simply removing the water formed by the combustion of the hydrogen of hydrocarbons, in other words, the oxides of carbon can be controlled and limited to a very small quantity where the combustible is mainly hydrogen, or to a larger quantity where the combustible is mainly or all hydrocarbons.

The drawings show external cooling means for partially cooling the gases leaving retorts but this partial cooling could as well be accomplished by vaporizing a liquid injected into the gases and while the apparatus described herein provides for heating and dissociating in a downward direction, yet the process could as well be carried out in apparatus in which the heating is downward and the dissociating upward or vice versa, or in apparatus having one section of checkerwork instead of two as shown in the drawings. The process could also be carried out as described while at the same time admitting small volumes of air during and preferably at the end of the dissociation periods for the well known purpose of prolonging the dissociating period and increasing the volume of residual gases. Obviously there are still other ways of carrying out the process of the present invention without departing from the spirit and scope of the present invention, therefore I do not wish to be understood as limiting myself excepting by the following claims when construed in the light of the prior art.

What I claim is:

1. The process of producing carbon black which comprises, alternating the periods of combustion and dissociation of hydrocarbons within a closed retort containing heat contacting surfaces of refractory material, condensing and removing water from the combustion gases, subjecting the gases remaining after said removal of water, together with hydrocarbons, to high temperatures during said dissociation periods whereby carbon black is produced in a diluted atmosphere of hydrogen substantially free from the presence of water, and separating the carbon black from the gaseous mixture.

2. The process of producing carbon black which comprises, heating checkerwork by the combustion of hydrocarbons, removing water from a portion of the combustion gases, subjecting the gases remaining after said removal of water, together with hydrocarbons, to the dissociation temperatures of said hydrocarbons by passing the mixture over checkerwork previously heated by said combustion of hydrocarbons thereby producing carbon black in an atmosphere substantially of hydrogen, nitrogen and the oxides of carbon, and separating the carbon black from the gaseous mixture.

3. The process of producing carbon black which comprises, alternating the periods of combustion and dissociation of hydrocarbons within closed retorts containing heat contacting surfaces of refractory material, removing water from the combustion gases of said combustion periods, subjecting the gases remaining after said removal of water, together with hydrocarbons, to high temperatures during said dissociation periods, whereby carbon black is produced in an atmosphere substantially of hydrogen, nitrogen, and the oxides of carbon, and separating the carbon black from the gaseous mixture, while partially cooling the gases leaving said retorts by liquid means and then cooling further by heat exchange with the gases entering said retorts.

4. The process of producing carbon black which comprises, removing water from combustion gases, subjecting the gases remaining after said removal of water, together with hydrocarbons, to the dissociation temperatures of said hydrocarbons by passing the mixture over previously heated contacting surfaces so formed as to avoid abrupt contact with the products of dissociation thereby preventing any substantial separation of the carbon black from the gases and lodgment on said heat contacting surfaces, thus producing carbon in a diluted atmosphere of hydrogen substantially free from the presence of water, and separating the carbon black from the gaseous mixture.

5. The process of producing carbon black which comprises, alternating heating periods with periods of the dissociation of hydrocarbons within a closed retort containing heat contacting surfaces of refractory material, controlling the degree of dissociation during said dissociation periods to leave small and limited quantities of hydrocarbons undecomposed, utilizing the gaseous products of dissociation for combustion during said heating periods to produce combustion gases containing limited quantities of the oxides of carbon, removing water from said combustion gases and subjecting the gases remaining after said removal of water, together with hydrocarbons, to high temperatures during said dissociation periods wherein the degree of dissociation is controlled and whereby carbon black is produced in an atmosphere of hydrogen diluted with nitrogen and limited quantities of undecomposed hydrocarbons and the oxides of carbon, and separating the carbon black from the gaseous mixture.

6. The process of producing carbon black which comprises, alternating heating periods with periods of the dissociation of hydrocarbons within a closed retort containing heat contacting surfaces of refractory material, controlling the degree of dissociation during said dissociation periods to leave limited quantities of hydrocarbons undecomposed, utilizing the gaseous products of dissociation for combustion during said heating periods to produce combustion gases containing limited quantities of an oxide of carbon, removing water from a portion of said combustion gases and subjecting the gases remaining after said removal of water, together with hydrocarbons, to high temperatures during said dissociation periods wherein the degree of dissociation is controlled and whereby carbon black is produced in an atmosphere of hydrogen diluted with nitrogen and limited quantities of undecomposed hydrocarbons and an oxide of carbon, and separating the carbon black from the gaseous mixture.

7. The process of producing carbon black which comprises, alternating heating periods with periods of the dissociation of hydrocarbons within a closed retort containing heat contacting surfaces of refractory material so formed as to avoid abrupt contact with the products of dissociation thereby preventing any substantial separation of carbon from the gases and lodgment on said heat contacting surfaces, controlling the degree of dissociation during said dissociation periods to leave a limited quantity of hydrocarbons undecomposed, utilizing the gaseous products of dissociation for combustion during said heating periods to produce combustion gases containing limited quantities of the oxides of carbon, removing water from a portion of said combustion gases and subjecting the gases remaining after said removal of water, together with hydrocarbons, to high temperatures during said dissociation periods wherein the degree of dissociation is controlled and whereby carbon black is produced in an atmosphere of hydrogen diluted with nitrogen and limited quantities of undecomposed hydrocarbons and the oxides of carbon, and separating the carbon black from the gaseous mixture.

8. The process of producing carbon black which comprises, alternating heating periods with periods of the dissociation of hydrocarbons within a closed retort containing heat contacting surfaces of refractory material, burning the hydrogen produced during said dissociation periods and limited quantities of hydrocarbons to produce limited quantities of the oxides of carbon in the combustion gases of said heating periods, removing water from the combustion gases thus produced and subjecting the gases remaining after said removal of water, together with hydrocarbons, to high temperatures during said dissociation periods whereby carbon black is produced in an atmosphere substantially of hydrogen, nitrogen and a limited quantity of the oxides of carbon, and separating the carbon black from the gaseous mixture.

9. The process of producing carbon black which comprises, heating checkerwork by the combustion of a mixture of hydrogen and hydrocarbons to produce combustion gases containing limited quantities of an oxide of carbon, removing water from a portion of said combustion gases and subjecting the gases remaining after said removal of water, together with hydrocarbons, to the dissociating temperatures of the latter by passing the mixture over said previously heated checkerwork whereby carbon black is produced in a diluted atmosphere of hydrogen containing limited quantities of an oxide of carbon, and separating the carbon black from the gaseous mixture.

10. The process of producing carbon black which comprises, burning hydrogen and hydrocarbons to produce combustion gases containing a limited quantity of the oxides of carbon, removing water from said combustion gases and subjecting the gases remaining after said removal of water, together with hydrocarbons, to the dissociating temperatures of the latter by passing the mixture over previously heated contacting surfaces so formed as to avoid abrupt contact with the products of dissociation thereby preventing any substantial separation of the carbon black from the gases and lodgment on said heat contacting surfaces, thus producing carbon in a diluted atmosphere of hydrogen containing a limited quantity of the oxides of carbon, and seperating the carbon black from the gaseous mixture.

11. The process of producing carbon black which comprises, alternating heating periods with periods of the dissociation of hydrocarbons within a closed retort containing heat contacting surfaces of refractory material, burning the hydrogen produced during said dissociation periods and a limited quantity of hydrocarbons to produce limited quantities of an oxide of carbon in the combustion gases of said heating periods, removing water from a portion of the combustion gases thus produced and subjecting the gases remaining after said removal of water, together with hydrocarbons, to high temperatures during said dissociation periods whereby carbon black is produced in a diluted atmosphere of hydrogen containing limited quantities of an oxide of carbon, and separating the carbon black from the gaseous mixture, while partially cooling the gases leaving said retort by liquid means then further by heat exchange with the gases entering said retort.

12. The process of producing carbon black which comprises, producing combustion gases containing controlled and limited quantities of an oxide of carbon, removing water from said combustion gases and subjecting the gases remaining after said removal of water, together with hydrocarbons, to the dissociating temperatures of the latter whereby carbon black is produced in a diluted atmosphere of hydrogen containing controlled and limited quantities of an oxide of carbon, and separating the carbon black from the gaseous products of dissociation.

13. The process of producing carbon black which comprises, removing water from combustion gases produced wiithin the process, subjecting the gases remaining after said removal of water, together with hydrocarbons, to high temperatures by passing the mixture over heated contacting surfaces so as to decompose said hydrocarbons, and then separating the carbon black from the gaseous mixture.

FORREST C. REED.